US008457008B2

(12) United States Patent
Lim et al.

(10) Patent No.: US 8,457,008 B2
(45) Date of Patent: Jun. 4, 2013

(54) METHOD OF TRANSMITTING FEEDBACK INFORMATION FOR PERFORMING COLLABORATIVE MIMO (75) Inventors: Dong Guk Lim, Anyang-si (KR); Su Nam Kim, Anyang-si (KR); Bin Chul Ihm, Anyang-si (KR); Jae Wan Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 392 days.

(21) Appl. No.: 12/739,351

(22) PCT Filed: Dec. 28, 2008

(86) PCT No.: PCT/KR2008/007704
§ 371 (c)(1),
(2), (4) Date: Aug. 24, 2010

(87) PCT Pub. No.: WO2009/082179
PCT Pub. Date: Jul. 2, 2009

(65) Prior Publication Data
US 2010/0309996 A1 Dec. 9, 2010

Related U.S. Application Data (60) Provisional application No. 61/016,599, filed on Dec. 26, 2007.

(30) Foreign Application Priority Data
Feb. 11, 2008 (KR) ........................ 10-2008-0012162

(51) Int. Cl.
*G01R 31/08* (2006.01)
(52) U.S. Cl.
USPC ......................................... 370/252; 370/328

(58) Field of Classification Search
USPC ................. 370/208, 252, 328, 329; 375/260, 375/267; 700/53
See application file for complete search history.

(56) References Cited

U.S. PATENT DOCUMENTS

| 6,665,521 | B1 | 12/2003 | Gorday et al. | |
|---|---|---|---|---|
| 6,785,513 | B1 | 8/2004 | Sivaprakasam | |
| 2004/0225740 | A1 | 11/2004 | Klemba et al. | |
| 2005/0281228 | A1* | 12/2005 | Oh et al. | 370/331 |
| 2008/0108310 | A1* | 5/2008 | Tong et al. | 455/69 |
| 2008/0117999 | A1* | 5/2008 | Kadous et al. | 375/267 |
| 2011/0007689 | A1* | 1/2011 | Shen et al. | 370/328 |
| 2011/0063997 | A1* | 3/2011 | Gras et al. | 370/254 |

FOREIGN PATENT DOCUMENTS

WO WO 2006/020339 A2 2/2006

* cited by examiner

*Primary Examiner* — Jung Park
(74) *Attorney, Agent, or Firm* — McKenna Long & Aldridge LLP (57) ABSTRACT A method of transmitting information necessary for performing collaborative multi input multi output (MIMO) operation between a mobile station and a base station in order to improve reception performance of the mobile station in a multi-cell environment is provided. The mobile station may receive a feedback channel for the collaborative MIMO which is allocated by a serving base station and transmit a collaborative MIMO indicator including information indicating that the collaborative MIMO is started to the serving base station. In addition, the mobile station may transmit the feedback information of each of the serving base station and a collaborative base station to the serving base station through the feedback channel, and the serving base station may transmit the feedback information to the collaborative base station via a backbone network. The mobile station may receive the collaborative MIMO supported by the serving base station and the collaborative base station.

12 Claims, 8 Drawing Sheets

METHOD OF TRANSMITTING FEEDBACK INFORMATION FOR PERFORMING COLLABORATIVE MIMO

This application claims the benefit of PCT/KR2008/007704, filed Dec. 26, 2008 and claims priority to U.S. Provisional Application No. 61/016,599 filed Dec. 26, 2007, and Korean Application No: 10-2008-0012162, filed Feb. 11, 2008, all of which are hereby incorporated by reference herein in their entireties.

TECHNICAL FIELD

The present invention relates to a method of transmitting necessary information when a mobile station and a base station perform a collaborative multi input multi output (MIMO) operation, in order to improve reception capability of the mobile station in a multi-cell environment.

BACKGROUND ART

Hereinafter, a general MIMO system and a collaborative MIMO system will be briefly described.

Recently, the MIMO system has come into the spotlight as a wideband wireless mobile communication technology. In particular, the MIMO system can improve spectrum efficiency in proportion to the number of antennas, which is hard to be realized in the existing single input single output (SISO) communication technology.

The MIMO technology refers to a multi-antenna technology of realizing high-speed communication using multiple antennas. The MIMO technology may be divided into a spatial multiplexing scheme and a space diversity scheme depending on whether or not the same data is transmitted.

The spatial multiplexing scheme refers to a scheme of simultaneously transmitting different data via several transmission/reception antennas. That is, a transmitter transmits different data via transmission antennas and a receiver receives the transmitted data by performing suitable interference elimination and signal processing, thereby improving a transfer rate by the number of transmission antennas.

The spatial diversity scheme refers to a scheme of transmitting the same data via multiple transmission antennas and obtaining transmission diversity. That is, the spatial diversity scheme is a space-time channel coding scheme. The spatial diversity scheme can maximize a transmission diversity gain (performance again) by transmitting the same data via the multiple transmission antennas. The spatial diversity scheme can improve transmission reliability due to the diversity gain, but cannot improve the transfer rate.

In addition, the MIMO technology may be divided into an open loop scheme (e.g., a Bell Labs layered space time (BLAST), a space time trellis code (STTC) or the like) and a closed loop scheme (e.g., transmit adaptive array (TxAA) or the like) depending on whether channel information is fed back from the receiver to the transmitter.

The collaborative MIMO is suggested in order to reduce inter-cell interference in a multi-cell environment. If the collaborative MIMO system is used, a mobile station may commonly receive data from multi-cell base stations. In addition, the base stations can simultaneously support one or more mobile stations $MS_1, MS_2, \ldots,$ and $MS_K$ using the same radio frequency resource in order to improve system performance. In addition, each of the base stations can perform a space division multiple access (SDMA) method on the basis of channel state information between the base station and the mobile station.

In the collaborative MIMO, a serving base station and one or more collaborative base stations are connected to a scheduler via a backbone network. The scheduler may receive channel information representing the channel state between the mobile stations $MS_1, M_2, \ldots,$ and $MS_K$ and the collaborative base stations, which is measured by the base stations $BS_1, BS_2, \ldots,$ and $BS_K$ via the backbone network, and may operate on the basis of the channel information. For example, the scheduler schedules information for a collaborative MIMO operation with respect to the serving base station and one or more collaborative base stations. That is, the scheduler directly instructs the base stations to perform the collaborative MIMO operation.

DISCLOSURE

Technical Problem

In a general technology, mobile stations using the collaborative MIMO report information necessary for the collaborative MIMO operation to only a serving base station, but do not report it to collaborative base stations. The serving base station transmits feedback information to a scheduler via a backbone network, and the scheduler provides information for the collaborative MIMO to the collaborative base stations.

Due to the general collaborative MIMO operation, time delay is increased until the collaborative base stations receive the feedback information. In addition, due to transmission delay which occurs when the feedback information is periodically transmitted, the feedback information transmitted to the collaborative base stations may not be applied to the collaborative MIMO operation. Accordingly, it is difficult to flexibly cope with the rapid variation of the channel.

An object of the present invention devised to solve the problem lies on a method of improving reception performance of a mobile station in a multi-cell environment.

Another object of the present invention devised to solve the problem lies on a method of transmitting feedback information and necessary information when base stations and mobile stations perform a collaborative MIMO operation in a multi-cell environment.

Technical Solution

The object of the present invention can be achieved by providing a method of transmitting information necessary for performing collaborative multi input multi output (MIMO) operation between a mobile station and a base station in order to improve reception performance of the mobile station in a multi-cell environment.

In an aspect of the invention, there is a method of transmitting feedback information for collaborative multi input multi output (MIMO), the method including: receiving a feedback channel which is allocated by a serving base station for the collaborative MIMO; transmitting a collaborative MIMO indicator including information indicating that the collaborative MIMO is started to the serving base station; transmitting the feedback information of each of the serving base station and a collaborative base station to the serving base station through the feedback channel; and receiving data from the collaborative base station performing the collaborative MIMO, wherein the collaborative base station receives the feedback information via a backbone network.

The method may further include acquiring the feedback information of each of the serving base station and the collaborative base station. The feedback information may include a channel state indicator, a preceding matrix indicator, and a channel quality indicator, and the feedback information may further include at least one of a user identifier, a base station identifier, a cell identifier and a collaborative MIMO indicator. The feedback information may further include at least one of a signal power indicator and an interference state indicator.

At this time, the mobile station may set predetermined feedback information as a reference value and transmit an offset value representing a difference between the reference value and other feedback information and the reference value to the serving base station.

In another aspect of the present invention, provided herein is a method of transmitting feedback information for collaborative multi input multi output (MIMO), the method including: receiving a first feedback channel which is allocated by a serving base station for the collaborative MIMO; receiving a second feedback channel which is allocated by a collaborative base station for the collaborative MIMO; transmitting feedback information regarding to the serving base station via the first feedback channel; transmitting feedback information regarding to the collaborative base station via the second feedback channel; and receiving data from the serving base station and the collaborative base station which perform the collaborative MIMO, wherein the data is transmitted using the collaborative MIMO.

The method may further include transmitting a collaborative MIMO indicator including information indicating that the collaborative MIMO is started to the serving base station and the collaborative base station.

The method may further include acquiring the feedback information of each of the serving base station and the collaborative base station.

As the feedback channel, a common channel may be allocated to the serving base station and the collaborative base station with respect to at least one of a time, a space and a frequency. At this time, the feedback information may be identified using code sets or hopping patterns which differ according to the base station and the collaborative base station on the common channel. In addition, as the feedback channel, different channels may be allocated to the serving base station and the collaborative base station with respect to at least one of a time, a space and a frequency.

In another aspect of the present invention, provided herein is a method of transmitting feedback information for collaborative multi input multi output (MIMO), the method including: allocating a feedback channel to a mobile station for the collaborative MIMO; receiving information representing the start of the collaborative MIMO from the mobile station; sending the information to a collaborative base station via a backbone network; supporting the collaborative MIMO to the mobile station with the collaborative base station; receiving feedback information regarding to the base station and the collaborative base station from the mobile station via the feedback channel; and transmitting the feedback information to the collaborative base station via the backbone network.

In another aspect of the present invention, provided herein is a method of transmitting feedback information for collaborative multi input multi output (MIMO), the method including: allocating a first feedback channel for the collaborative MIMO at a serving base station; allocating a second feedback channel for the collaborative MIMO at a collaborative base station; at the serving base station, receiving a message including information related to the start of the collaborative MIMO from the mobile station; at the serving base station, receiving feedback information regarding to the serving base station via the first feedback channel from the mobile station; and at the collaborative base station, receiving feedback information regarding to the collaborative base station via the second feedback channel from the mobile station, wherein the base station and the collaborative base station transmit data to the mobile station, and the data is transmitted by the collaborative MIMO.

Advantageous Effects

The present invention has the following effects.

First, it is possible to reduce data transmission delay by directly transmitting feedback information from a mobile station to a base station at the time of a collaborative MIMO operation or directly transmitting the feedback information from the serving base station to a collaborative base station. In addition, it is possible to provide an improved service by reducing error in feedback information periodically reported due to transmission delay in the collaborative MIMO operation.

Second, the feedback information transmitted by the mobile station is directly transmitted to the serving base station and the collaborative base station without using a controller or a scheduler. Accordingly, it is possible to flexibly cope with the rapid variation of a communication channel during the collaborative MIMO operation by immediately using the feedback information at the serving base station and the collaborative base station. Accordingly, it is possible to increase a channel gain.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Hereinafter, methods of improving reception performance of a mobile station in a multi-cell environment according to the embodiments of the present invention will be described.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station (MS)" may also be replaced with a user equipment (UE), a mobile terminal or a mobile subscriber station (MSS) as necessary.

The following embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

Prior to describing the present invention, it should be noted that specific terms disclosed in the present invention are proposed for the convenience of description and better understanding of the present invention, and the use of these specific terms may be changed to another format within the technical scope or spirit of the present invention.

Hereinafter, the embodiments of the present invention will be described in detail with reference to the accompanying drawings.

Figure 1:
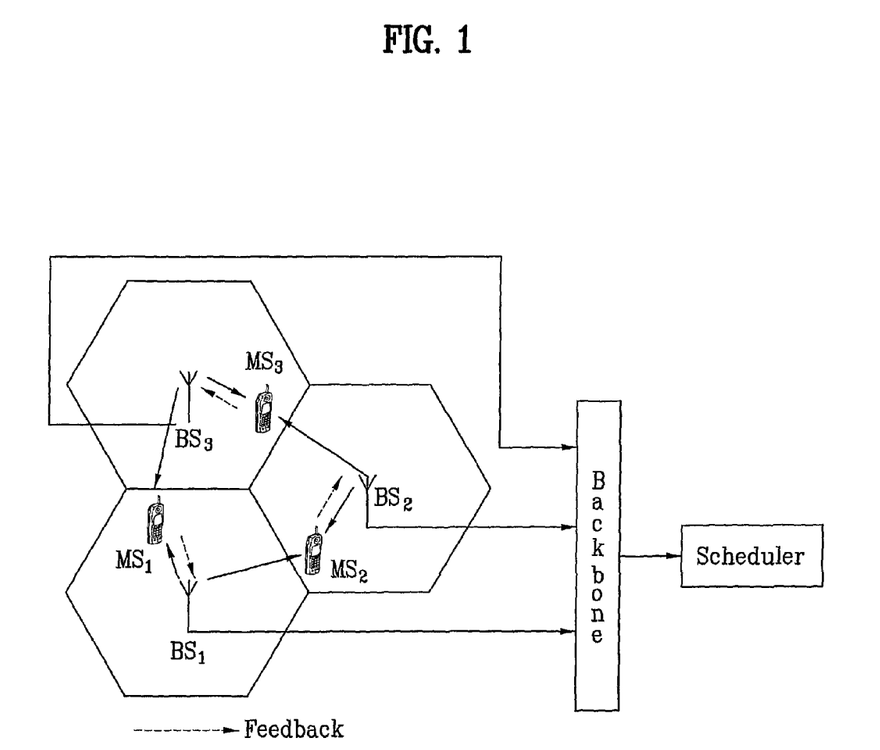
FIG. 1 is a view showing a process of feeding back data information in a collaborative MIMO system.

FIG. 1 is a view showing a process of feeding back data information in a collaborative MIMO system.

In FIG. 1, $MS_1$ denotes a mobile station belonging to a cell area of $BS_1$, $MS_2$ denotes a mobile station belonging to a cell area of $BS_2$, and $MS_3$ denotes a mobile station belonging to a cell area of $BS_3$. A serving base station denotes a main base station for providing a service to mobile stations in each cell area and a collaborative base station (CBS) denotes a base station for providing a service in a neighbor cell area of each cell area. In addition, a serving base station for providing a service to a specific mobile station may be a collaborative base station for providing a collaborative MIMO service to another mobile station.

Each mobile station report feedback information necessary for a collaborative MIMO operation to each serving base station on the basis of received information. The feedback information reported to each serving base station is reported to a scheduler via a backbone network. The scheduler instructs each collaborative base station to perform the collaborative MIMO operation on the basis of the received feedback information.

For example, referring to FIG. 1, a plurality of collaborative base stations is connected to the scheduler via the backbone network. The scheduler may receive information about mobile stations $MS_1$, $MS_2$ and $MS_3$ measured by the serving base stations and channel information between the base stations via a backbone network and may operate on the basis of the information. At this time, the scheduler may transmit the feedback information for the collaborative MIMO to the serving base stations and the collaborative base stations. Similarly, the mobile stations $MS_2$ and $MS_3$ may perform the collaborative MIMO.

Figure 2:
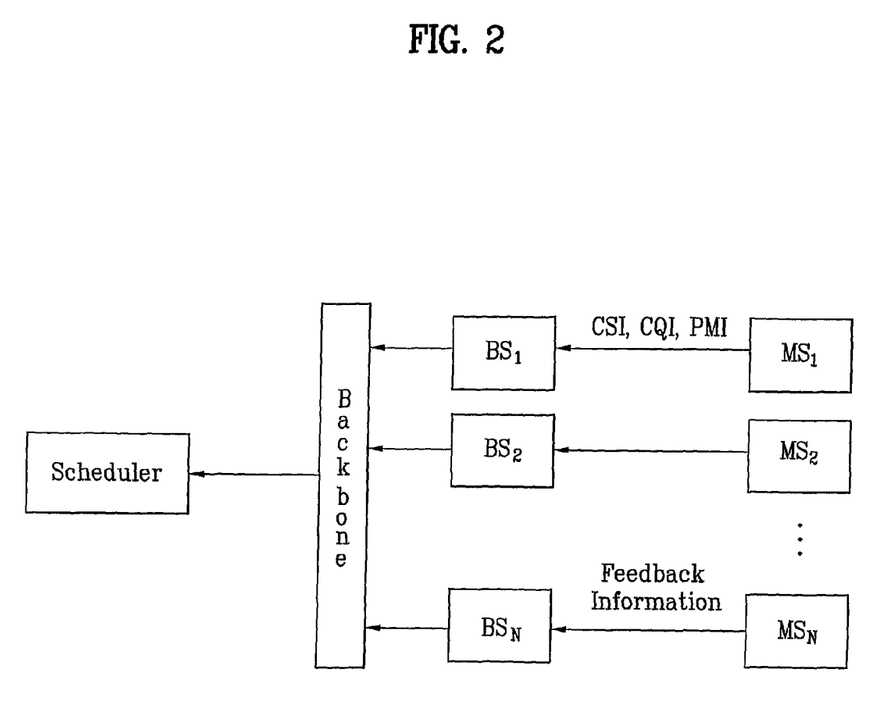
FIG. 2 is a view showing the flow of the feedback information of the collaborative MIMO.

FIG. 2 is a view showing the flow of the feedback information of the collaborative MIMO.

Referring to FIG. 2, the mobile stations $MS_1, MS_2, \ldots$, and $MS_N$ transmit the feedback information to the serving base stations $BS_1, BS_2, \ldots$, and $BS_N$, respectively. The serving base stations may transmit the feedback information to the scheduler via the backbone network.

The transmitted feedback information is as follows. The feedback information includes a channel state indicator (CST), a channel quality indicator (CQI), a precoding matrix indicator (PMI) and a received signal strength indicator (RSSI). At this time, the CSI, the CQI and the PMI are necessarily transmitted as basic information. The RSSI is feedback information which may be transmitted according to a channel environment as the strength of the received signal measured by a receiver.

The scheduler can grasp the association between the base stations and the mobile stations using the feedback information received via the backbone network. Accordingly, the scheduler may transmit a scheduling decision message to the collaborative base stations $BS_1, BS_2, \ldots$, and $BS_N$ via the backbone network. By the scheduling decision message transmitted to the collaborative base stations via the backbone network, the collaborative base stations $BS_i$ may feed back the channel information of the serviced mobile stations. That is, the collaborative base stations may perform the SDMA by estimating an independent precoding matrix $W_i$ on the basis of the fed-back channel information.

Figure 3:
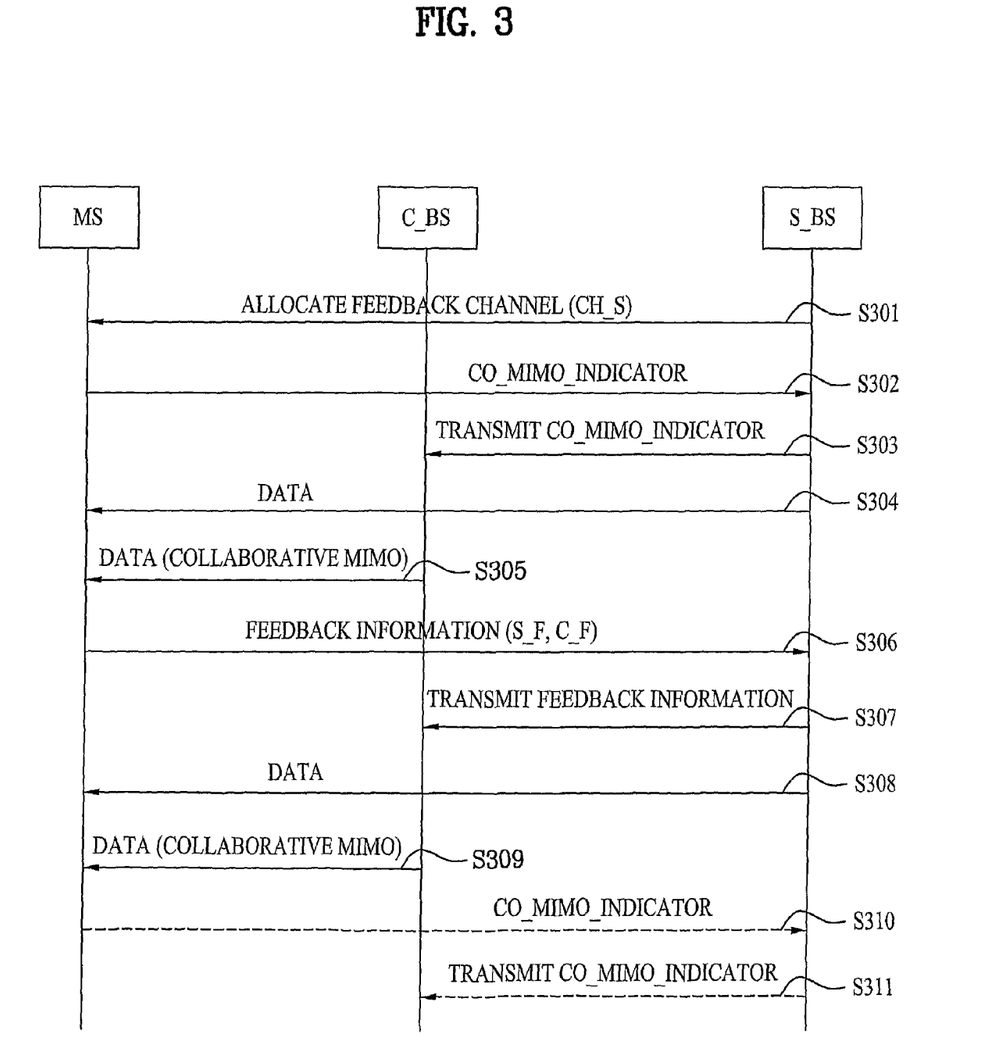
FIG. 3 is a view showing a method of transmitting feedback information for performing the collaborative MIMO according to an embodiment of the present invention.

FIG. 3 is a view showing a method of transmitting feedback information for performing the collaborative MIMO according to an embodiment of the present invention.

In FIG. 3, a mobile station (MS) receives a data service from a serving base station S_BS. At this time, a neighbor base station may provide a collaborative MIMO service to the MS in order to improve a data transfer rate. Such a neighbor base station is called a collaborative base station C_BS. The collaborative base station is one of the base stations located in the neighborhood of the serving base station. Accordingly, the number of collaborative base stations may be one or more.

Referring to FIG. 3, the serving base station for currently providing the service may allocate a feedback channel (CH_S) for the collaborative MIMO operation to the MS (S301).

The MS may perform the collaborative MIMO with the serving base station and the collaborative base station. At this time, the MS may transmit a collaborative MIMO indicator Co_M_Indicator indicating that the collaborative MIMO is started to the serving base station (S302).

In the step S302, the collaborative MIMO indicator may include information indicating an explicit time when the collaborative MIMO operation is started, changed or ended or information indicating just a request for start, change, or end of the collaborative MIMO operation. The collaborative MIMO indicator may be transmitted to the serving base station when the collaborative MIMO operation is started, changed, or ended.

In addition, since the collaborative MIMO operation is generally performed in the edge of a cell, the MS may perform handover to another base station area during the collaborative MIMO operation. In this case, the MS may transmit the collaborative MIMO indicator including information about the handover to the serving base station.

The serving base station which receives the collaborative MIMO indicator from the MS may deliver the collaborative MIMO indicator to the collaborative base station. The collaborative base station may provide a collaborative MIMO service to the MS using the collaborative MIMO indicator (S303).

The MS may receive data from the serving base station and the collaborative base station by the collaborative MIMO operation (S304 and S305).

When the MS receives the data from the serving base station and the collaborative base station, the MS may measure the information about the state of the channel for currently transmitting/receiving the data and the feedback information. Accordingly, the MS may feed back the feedback information C_F and the channel information S_C of the serving base station and the collaborative base station via the feedback channel allocated by the serving base station (S306).

In the step S306, the feedback information transmitted for the collaborative MIMO may include the Channel Quality Indicator (CQI), the Pre-coding Matrix Indicator (PMI) and the Channel Status Indicator (CSI). The CQI indicates the quality information of a communication channel currently connected between the MS and the base station. The PMI indicates a maximum CQI value of a communication stream, and the CSI indicates a channel state between the MS and the base station. In addition, the collaborative MIMO indicator Co_MIMO_Indicator may include information indicating that the collaborative MIMO operation is started or ended or information indicating that the collaborative MIMO service is changed. In the embodiments of the present invention, the MS may perform the collaborative MIMO operation by transmitting the collaborative MIMO indicator to the serving base station.

In the step S306, the MS may transmit the feedback information including a user identifier User_ID, a base station identifier BS_ID and a cell identifier Cell_ID. In addition, the MS may selectively include additional information such as a signal power indicator (SPI) and an interference state indicator (ISI) in the feedback information according to a channel state. At this time, the SPI indicates information about the level of a signal transmitted from each of the base stations during the collaborative MIMO operation. In addition, the ISI indicates the interference state of the MS, which is necessary for selecting the collaborative base station, before the collaborative MIMO operation is performed.

The serving base station may directly transmit the feedback information received from the MS to the collaborative base station via the backbone network (S307).

The collaborative base station may perform the collaborative MIMO operation using the feedback information transmitted from the serving base station. That is, the serving base station may transmit data to the MS (S308), and the collaborative base station may perform the collaborative MIMO operation in order to improve a data transfer rate of the serving base station (S309).

During the collaborative MIMO operation, the MS may perform the handover to another base station or the collaborative MIMO may not be supported. In this case, the MS may transmit the collaborative MIMO indicator to the serving base station in order to inform that the collaborative MIMO is ended (S310).

In addition, the serving base station may transmit the collaborative MIMO indicator to the collaborative base station in order to inform the collaborative base station that the collaborative MIMO operation is ended (S311).

The steps S310 and S311 are optional. Although the steps S310 and S311 are not performed by the MS and the serving base station, the collaborative MIMO operation is not influenced. However, it is possible to prevent the unnecessary waste of a signal by rapidly informing the serving base station and the collaborative base station that the collaborative MIMO is ended.

Figure 4:
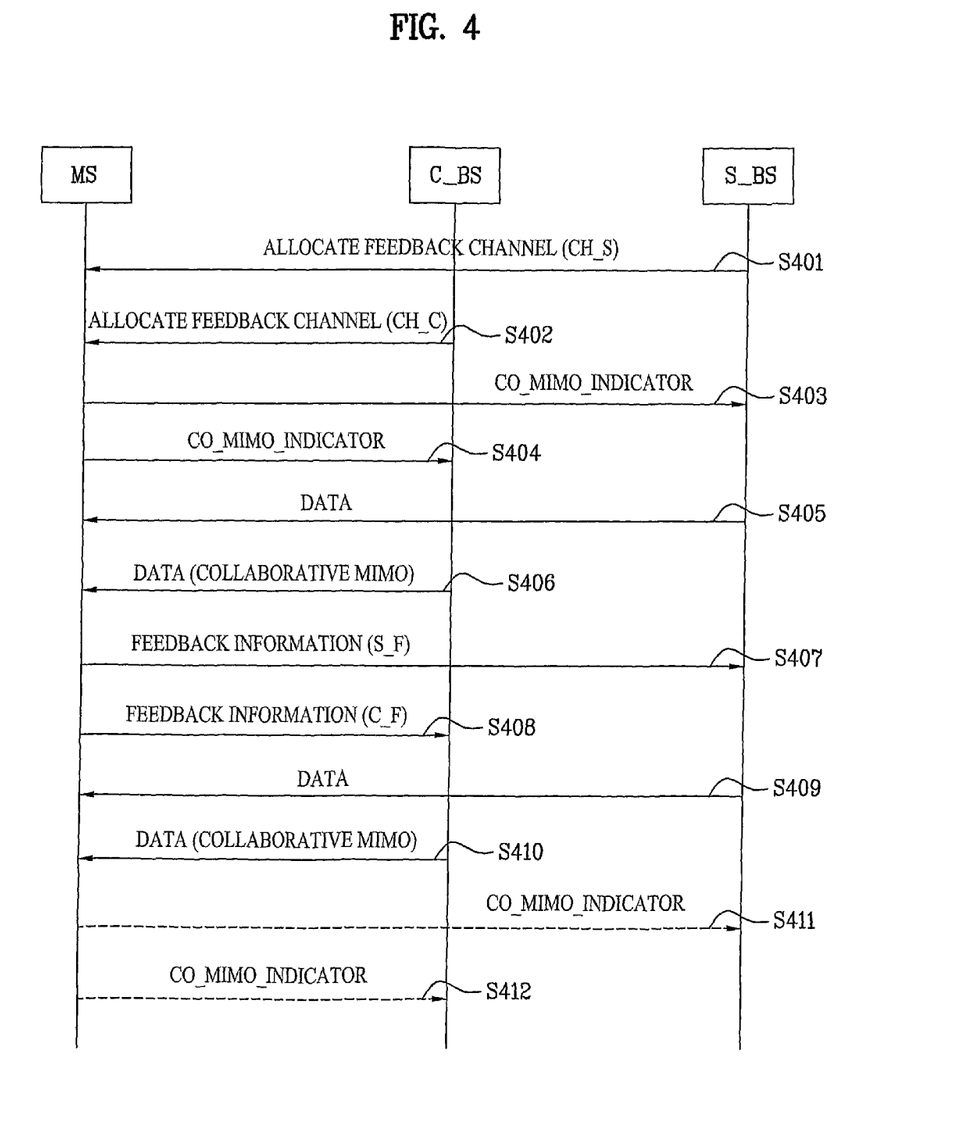
FIG. 4 is a view showing a method of transmitting feedback information for performing the collaborative MIMO according to another embodiment of the present invention.

FIG. 4 is a view showing a method of transmitting feedback information for performing the collaborative MIMO according to another embodiment of the present invention.

In FIG. 4, an MS receives a service from a serving base station S_BS. In addition, a neighbor base station may provide a collaborative MIMO service to the MS in order to improve a data transfer rate. Such a neighbor base station is called a collaborative base station C_BS.

Referring to FIG. 4, the serving base station S_BS or the collaborative base station C_BS for currently providing the service may allocate a feedback channel CH_S or CH_C to the MS (S401 and S402).

In another embodiment of the present invention, the number of collaborative base stations which may be located in the neighborhood of the serving base station may be one or more. Accordingly, an efficient method of allocating the feedback channels to the MS at the serving base station and the collaborative base station is necessary. For example, all the base stations may allocate a feedback channel, which is common in at least one of a time, a space and a frequency, to the MS. In addition, the base stations may allocate different feedback channels to the MS on the time, the space or the frequency.

The MS may perform the collaborative MIMO with the serving base station and the collaborative base station. At this time, the MS may transmit a collaborative MIMO indicator Co_MIMO_Indicator related to the collaborative MIMO is started to the serving base station and the collaborative base station. That is, the MS may directly instruct or just request the serving base station and the collaborative base station to start the collaborative MIMO operation (S403 and S404).

In the steps S403 and S404, the collaborative MIMO indicator may include information indicating that the collaborative MIMO operation is started or ended. In addition, since the collaborative MIMO operation is generally performed in the edge of the cell, the MS may perform handover to another base station area during the collaborative MIMO operation. In this case, the MS may transmit the collaborative MIMO indicator including information about the handover.

The MS may receive data, to which the collaborative MIMO is applied, from the serving base station and the collaborative base station (S405 and S406).

In the steps S405 and S406, the MS may acquire the feedback information and the information about the channel allocated by the serving base station and the collaborative base station in a process of transmitting/receiving the data.

The MS may acquire the feedback information S_F and the channel information of the serving base station while the collaborative MIMO service is received. Accordingly, the MS may transmit the acquired feedback information S_F and channel information to the serving base station (S407).

In addition, the MS may acquire the feedback information C_F and the channel information of the collaborative base station while the collaborative MIMO operation is performed with the collaborative base station. Accordingly, the MS may transmit the acquired feedback information C_F and information about the channel state of the collaborative base station to the collaborative base station (S408).

The serving base station and the collaborative base station may efficiently transmit the data to the MS using the feedback information and the channel information fed back from the MS (S409 and S410).

During the collaborative MIMO operation, the MS may perform the handover to another base station or the collaborative MIMO may not be supported. In this case, the MS may transmit the collaborative MIMO indicator to the serving base station and the collaborative base station in order to inform that the collaborative MIMO is ended (S411 and S412).

The steps S411 and S412 are optional. Although the steps S411 and S412 are not performed by the MS and the serving base station, the collaborative MIMO operation is not influenced. However, it is possible to prevent unnecessary waste of a signal by rapidly informing the serving base station and the collaborative base station that the collaborative MIMO is ended.

Figure 5:
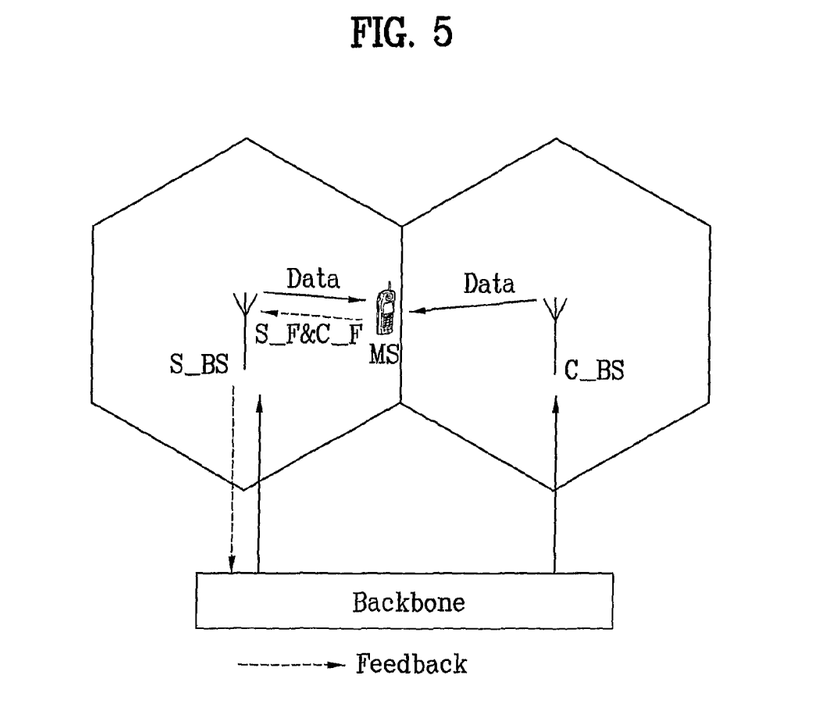
FIG. 5 is a view showing a process of, at each mobile station, transmitting feedback information of a serving base station and a collaborative base station to the serving base station according to an embodiment of the present invention.

FIG. 5 is a view showing a process of, at each mobile station, transmitting feedback information of a serving base station and a collaborative base station to a serving base station according to an embodiment of the present invention.

In FIG. 5, an MS is located in a cell of a serving base station S_BS. At this time, it is assumed that the MS is a mobile station which can support the collaborative MIMO. In addition, the MS may receive a collaborative MIMO service from a neighbor base station. At this time, the neighbor base station for providing the collaborative MIMO service is called a collaborative base station.

Referring to FIG. 5, the MS may currently receive data from the serving base station S_BS and the collaborative base station C_BS via a collaborative MIMO service. In addition, the serving base station may allocate the feedback channel for the collaborative MIMO service to the MS.

The MS may transmit a collaborative MIMO indicator CO_MIMO_Indicator including the information indicating that the collaborative MIMO is started to the serving base station in order to receive the collaborative MIMO service. The serving base station may transmit the collaborative MIMO indicator received from the MS to the collaborative base station via the backbone network.

The MS may acquire feedback information (serving feedback information) S_F for the collaborative MIMO service and the channel information of the serving base station in a process of receiving data from the serving base station. In addition, the MS may receive the collaborative MIMO service from the collaborative base station. In this process, the MS may acquire feedback information (collaborative feedback information) C_F for the collaborative MIMO service and the channel information of the collaborative base station.

The MS may transmit at least one of the feedback information S_F and C_F of the serving base station and the collaborative base station to the serving base station via the feedback channel allocated by the serving base station. The serving base station may directly transmit the feedback information and the channel information received from the MS to the collaborative base station via the backbone network. The collaborative base station may rapidly provide the collaborative MIMO service to the MS using the feedback information directly transmitted from the serving base station via the backbone network.

In addition, the MS may transmit the collaborative MIMO indicator to the serving base station via the channel allocated by the serving base station in order to inform that the collaborative MIMO operation is started, changed or ended. The serving base station may transmit the collaborative MIMO indicator received from the MS to the collaborative base station via the backbone network. The collaborative base station may check whether the collaborative MIMO communication is started, changed or ended via the collaborative MIMO indicator.

Figure 6:
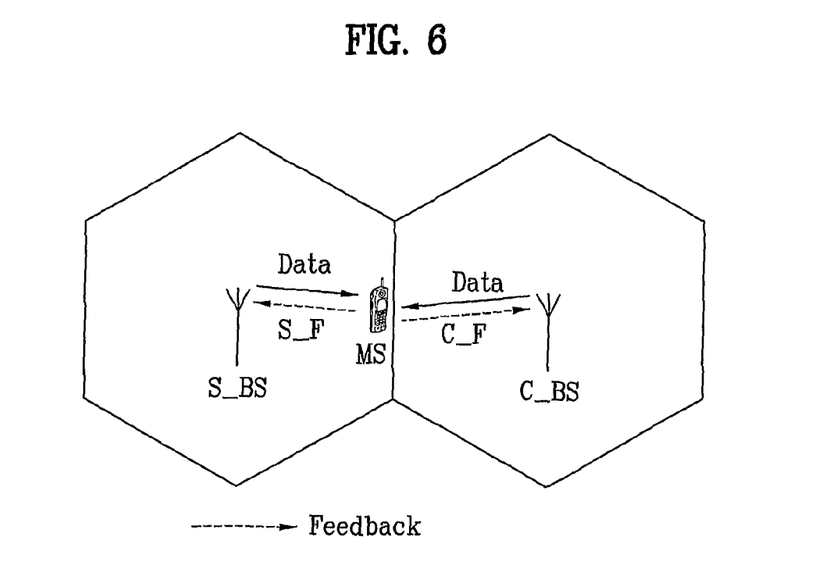
FIG. 6 is a view showing a method of, at a mobile station for performing a collaborative MIMO operation, transmitting channel information and feedback information to a serving base station and a collaborative base station according to another embodiment of the present invention.

FIG. 6 is a view showing a method of, at a mobile station for performing a collaborative MIMO operation, transmitting channel information and feedback information to a serving base station and a collaborative base station according to another embodiment of the present invention.

In FIG. 6, an MS is located in a cell of a serving base station S_BS. At this time, it is assumed that the MS can perform collaborative MIMO. In addition, the MS may receive a collaborative MIMO service from a neighbor base station. At this time, the neighbor base station for providing the collaborative MIMO service is called a collaborative base station.

Referring to FIG. 6, the MS currently receives data from the serving base station S_BS and the collaborative base station C_BS via the collaborative MIMO service. At this time, the serving base station may allocate a dedicated feedback channel for the collaborative MIMO service to the MS. In addition, the collaborative base station may allocate a dedicated feedback channel for the collaborative MIMO service provided by the collaborative base station to the MS.

The feedback channel allocated to the MS may be common in at least one of a time, a space and a frequency with respect to all base stations. Accordingly, all the base stations may transmit/receive the feedback information to/from MSs via the same channel. In addition, each of the base stations may allocate a specific feedback channel to the MS. That is, the feedback channels which differ according to the base stations in at least one of the time, the space and the frequency may be allocated.

The MS may transmit the collaborative MIMO indicator to the serving base station and the collaborative base station in order to inform that the collaborative MIMO is started. The serving base station and the collaborative base station may confirm a time point when the collaborative MIMO will be performed, if the collaborative MIMO indicator is received from the MS.

The MS may acquire feedback information S_F for the collaborative MIMO service and channel information of the serving base station in a process of receiving data from the serving base station. In addition, the MS may receive the collaborative MIMO service from the collaborative base station. In this process, the MS may acquire feedback information C_F for the collaborative MIMO service and channel information of the collaborative base station.

Referring to FIG. 6, the MS may directly feed back the feedback information S_F and C_F and the channel information of the serving base station and the collaborative base station measured during the collaborative MIMO operation to the serving base station and the collaborative base station.

That is, the MS may directly transmit the feedback information S_F of the serving base station via the feedback channel allocated by the serving base station and directly transmit the feedback information C_F of the collaborative base station via the feedback channel allocated by the collaborative base station. Accordingly, since the MS directly reports the feedback information necessary for performing the collaborative MIMO operation to the serving base station and the collaborative base station, the scheduler may not schedule the feedback information. That is, it is possible to reduce loss which occurs due to the transmission delay of the feedback information.

Figure 7:
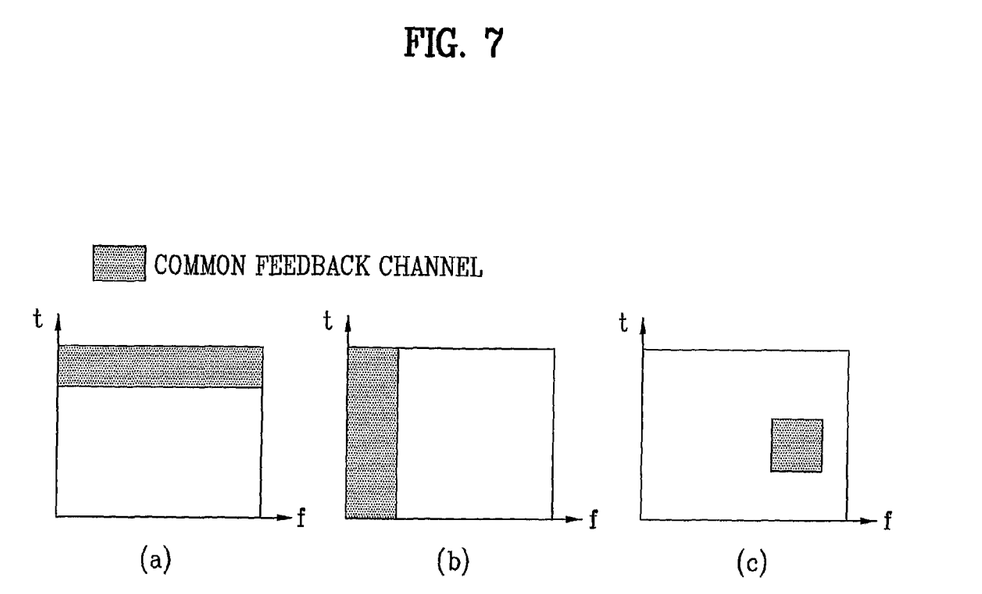
FIG. 7 is a view showing a method of allocating a feedback channel to a mobile station according to another embodiment of the present invention.

FIG. 7 is a view showing a method of allocating a feedback channel to a mobile station according to another embodiment of the present invention.

In FIG. 7, a vertical axis denotes a time domain t and a horizontal axis denotes a frequency domain f. Referring to FIG. 7, FIG. 7A shows a case where all the base stations use a common feedback channel on the time and FIG. 7B shows a case where all the base stations use a common feedback channel on the same frequency. FIG. 7C shows a case where all the base stations use a common feedback channel on a specific time and frequency. Although a common feedback channel on the space is not shown in FIG. 7, a common feedback channel may be configured using a spatial element.

In another embodiment of the present invention, the feedback information of the base stations needs to be distinguished in the case where all the base stations use the common feedback channel. Accordingly, the MS may distinguish the feedback information using code sets (e.g., orthogonal codes) or hopping patterns which differ according to the base stations.

The MS may transmit the feedback information using a specific code set or hopping pattern of each base station. Accordingly, although at least one mobile station transmits the feedback information of at least one base station via the common feedback channel, it is possible to prevent synchronization error due to the channel.

For example, each MS transmits the feedback information using an orthogonal code over the common channel in order to report the feedback information to the collaborative base station. At this time, the collaborative base station can grasp the correlationship between its own orthogonal code and the orthogonal code included in the feedback information so as to detect the feedback information directed to the collaborative base station. That is, each of the base stations confirms its own feedback information using a specific code set (orthogonal code).

In addition, temporal/spatial division may be performed even in the common feedback channel such that the feedback channel allocated to each of the base stations is used.

Figure 8:
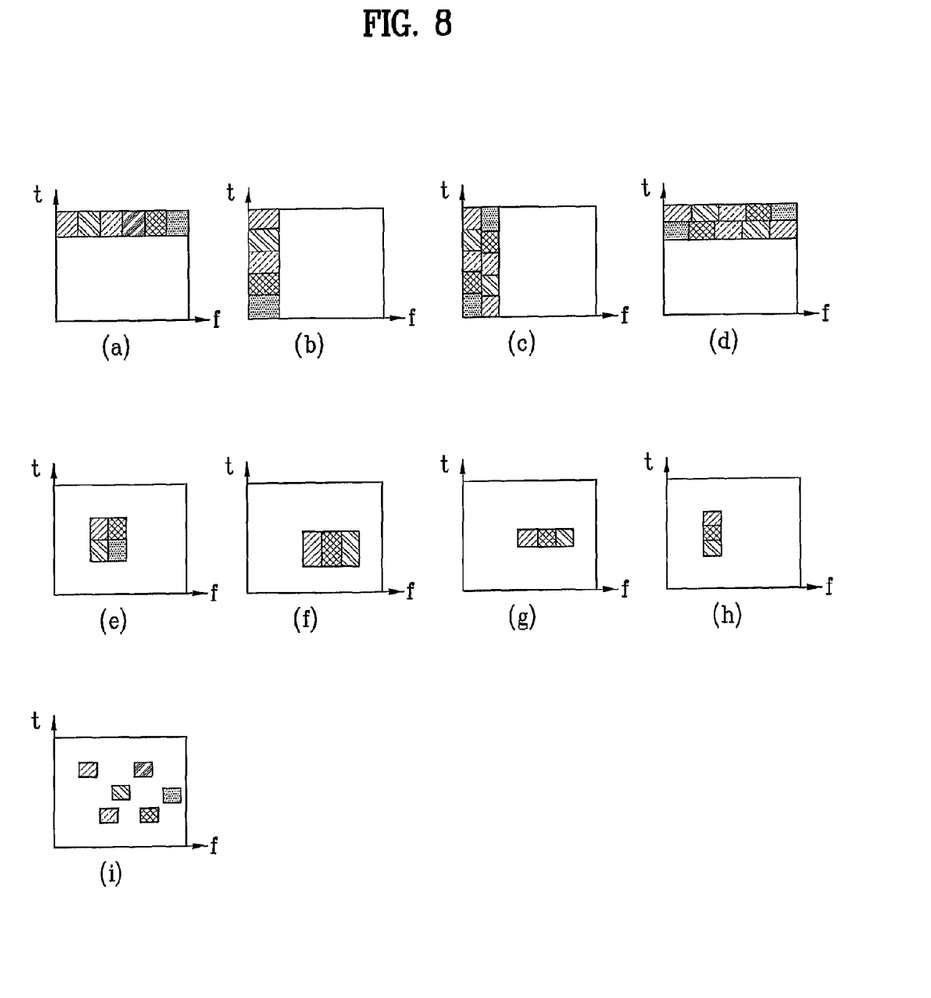
FIG. 8 is a view showing a method of allocating a feedback channel to a mobile station according to another embodiment of the present invention.

FIG. 8 is a view showing a method of allocating a feedback channel to a mobile station according to another embodiment of the present invention.

In FIG. 8, a vertical axis denotes a time domain t and a horizontal axis denotes a frequency domain f. Referring to FIG. 8, FIG. 8A shows a case where the feedback channels allocated by the base stations are equal in the time domain and are different in the frequency domain. FIG. 8B shows a case where the feedback channels allocated by the base stations are equal in the frequency domain and are different in the time domain. FIG. 8C shows a case where the feedback channels allocated by the base stations are different in the time domain and the frequency domain, as a modification of FIG. 8B. FIG. 8D shows a case where the feedback channels allocated by the base stations are different in the time domain and the frequency domain, as a modification of FIG. 8A. FIGS. 8E to 8I show various methods of allocating the feedback channels allocated to the mobile stations by the base stations on the basis of specific times and specific frequencies.

If the method of allocating the feedback channels of FIG. 8 is used, the feedback channel and the feedback information do not overlap with each other like the method of FIG. 7. Accordingly, the additional code sets or hopping patterns for distinguishing the feedback information are not necessary.

FIG. 8 shows various methods of allocating specific feedback channels to the mobile stations according to the base stations. The present invention is not limited to the method shown in FIG. 8, and a specific feedback channel may be configured using at least one of the time, the space and the frequency.

Figure 9:
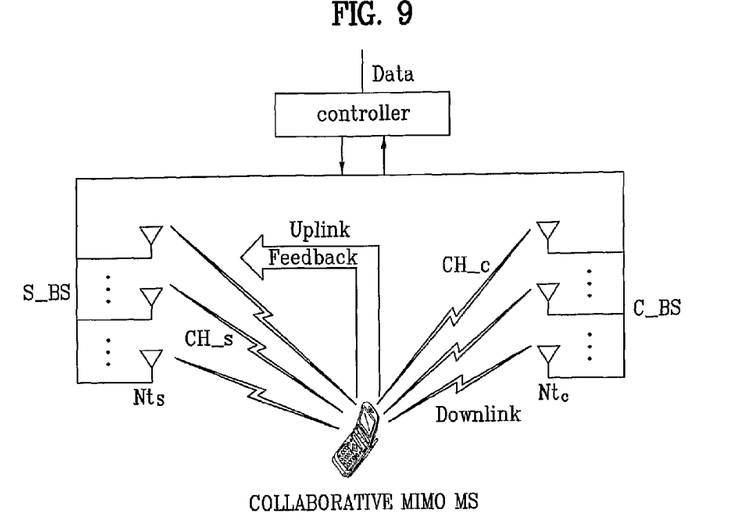
FIG. 9 is a view showing a method of transmitting both channel information and feedback information of a serving base station and a collaborative base station to the serving base station according to another embodiment of the present invention.

FIG. 9 is a view showing a method of transmitting both channel information and feedback information of a serving base station and collaborative base stations to the serving base station according to another embodiment of the present invention.

In FIG. 9, an MS is located in a cell of a serving base station S_BS. At this time, it is assumed that the MS can support collaborative MIMO. In addition, the MS may receive a collaborative MIMO service from a neighbor base station. At this time, the neighbor base station for providing the collaborative MIMO service is called a collaborative base station C_BS. In order to provide the collaborative MIMO service, the serving base station and the collaborative base station are connected to a controller.

The controller may transmit data provided to the MS to the base stations during the collaborative MIMO operation. The serving base station and the collaborative base station may transmit the data received from the controller to the MS by the collaborative MIMO operation. At this time, the MS which receives the data from the serving base station and the collaborative base station transmit the feedback information necessary for performing the collaborative MIMO to the serving base station and the collaborative base station.

The feedback information transmitted for the collaborative MIMO includes a CQI, a PMI and a CSI. In addition, preferably, the MS may further include additional information such as a user identifier User_ID, a base station identifier BS_ID, a cell identifier Cell_ID, an SPI, an ISI and a collaborative MIMO indicator Co_MIMO_Indicator in the feedback information. In addition, when the MS performs handover, a handover message including the feedback information and the additional information is necessary. At this time, at least one of the base station and the mobile station may perform power control of the signal transmitted between the base stations using the handover message.

Referring to FIG. 9, the MS which performs the collaborative MIMO operation may receive information transmitted from the serving base station and the collaborative base station having multiple antennas via the controller using a channel established between each of the base stations and the MS. The MS may collect the feedback information necessary for performing the collaborative MIMO operation in a process of receiving data. At this time, the MS may transmit the collected feedback information via the feedback channel of the serving base station. At this time, the feedback information transmitted from the MS to the serving base station may include the feedback information of the serving base station and the collaborative base station.

That is, the MS may report the feedback information between the MS and the serving base station and the feedback information between the MS and the collaborative base station to the serving base station via the feedback channel allocated by the serving base station. In addition, the serving base station may transmit the feedback information necessary for performing the collaborative MIMO operation to the collaborative base station. The feedback information necessary for the collaborative MIMO operation may be transmitted by different methods according to the kinds thereof.

For example, in the CQI which is one of the feedback information, both a CQI of a channel between the MS and a main base station and a CQI of a channel between the MS and the collaborative base station are necessary for the collaborative MIMO operation. Accordingly, the method of transmitting the CQI to the serving base station at the MS includes a method of transmitting both the CQIs of the channels of the serving base station and the collaborative base station and a method of using an offset.

If the offset is used, among the CQI measured by the MS which performs the collaborative MIMO operation, a specific CQI or any CQI may be used as a reference CQI. A ratio of another CQI to the reference CQI or a difference between another CQI and the reference CQI may be set to the offset and one CQI value (or the reference value) and the offset value may be transmitted. Accordingly, the MS can reduce overhead of the transmitted CQI by using the offset and reduce performance deterioration due to the transmission error.

In an MIMO using a precode, among PMIs reported to the base station by the MS, a PMI of the collaborative base station may be directly transmitted from the main base station to the collaborative base station and may be independently used in the collaborative base station in order to perform the collaborative MIMO operation.

Figure 10:
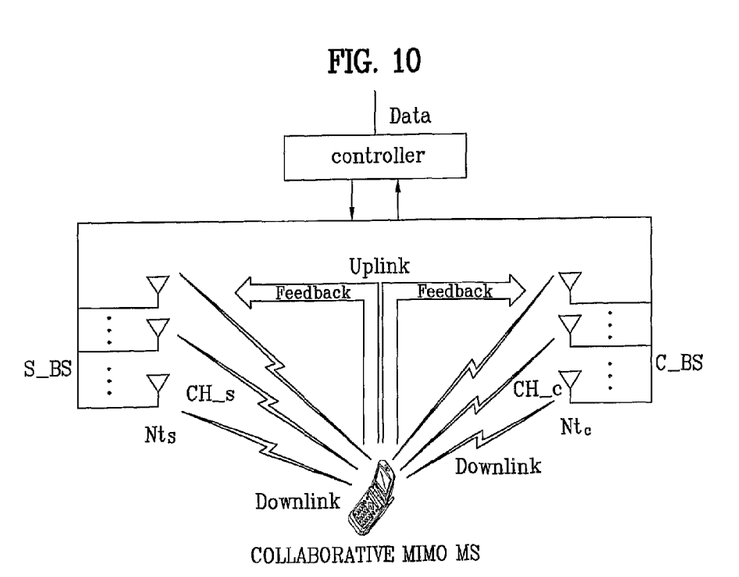
FIG. 10 is a view showing a method of, at a mobile station for performing the collaborative MIMO operation, directly transmitting feedback information using feedback channels allocated by a serving base station and a collaborative base station.

FIG. 10 is a view showing a method of, at a mobile station for performing the collaborative MIMO operation, directly transmitting feedback information using feedback channels allocated by a serving base station and a collaborative base station.

The configuration and the components of FIG. 10 are equal to those of FIG. 9 except that the collaborative base station allocates a feedback channel for performing a collaborative MIMO operation to the MS in FIG. 10. At this time, the methods described in FIGS. 7 and 8 may be used as the method of allocating the feedback channel to the MS at each base station.

The MS may transmit a collaborative MIMO indicator to the serving base station and the collaborative base station in order to inform the serving base station and the collaborative base station that the collaborative MIMO operation is started. The collaborative MIMO indicator may be used when the collaborative MIMO operation is changed or ended as well as when the collaborative MIMO operation is started.

Referring to FIG. 10, the serving base station and the collaborative base station may transmit the data received from the controller to the MS by the collaborative MIMO operation. At this time, the MS may acquire the feedback information necessary for performing the collaborative MIMO with respect to the serving base station and the collaborative base station. Accordingly, the MS may transmit the feedback information of the serving base station using the feedback channel allocated by the serving base station and transmit the feedback information of the collaborative base station using the feedback channel allocated by the collaborative base station.

The information necessary for performing the collaborative MIMO operation may be transmitted using the feedback transmitting methods described in FIGS. 9 and 10. In addition, the MS and the base station may transmit a handover message using the feedback methods of FIGS. 9 and 10 at the time of the handover.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The embodiments of the present invention are applicable to various radio access systems. Examples of the various radio access systems may include the $3^{rd}$ generation partnership project (3GPP) system, the 3GPP2 system and/or the Institute of Electrical and Electronic Engineers 802 system. The embodiments of the present invention are applicable to all technical fields using the various radio access systems as well as the various radio access systems.

The invention claimed is:

1. A method of transmitting feedback information for collaborative multi input multi output (MIMO), the method comprising:

receiving a feedback channel which is allocated by a serving base station for the collaborative MIMO;

transmitting a collaborative MIMO indicator including information representing when the collaborative MIMO is started to the serving base station;

receiving data from the serving base station after the collaborative MIMO is started;

receiving data from a collaborative base station performing the collaborative MIMO after the collaborative MIMO is started; and transmitting the feedback information of each of the serving base station and the collaborative base station to the serving base station through the feedback channel, wherein the collaborative base station receives the feedback information via a backbone network from the serving base station, and the feedback information includes a channel state indicator, a precoding matrix indicator, and a channel quality indicator.

2. The method according to claim 1, further comprising:
acquiring the feedback information of each of the serving base station and the collaborative base station.

3. The method according to claim 1, wherein
the feedback information further includes at least one of a user identifier, a base station identifier, a cell identifier, and a collaborative MIMO indicator.

4. The method according to claim 3, wherein the feedback information further includes at least one of a signal power indicator and an interference state indicator.

5. The method according to claim 4, wherein the transmitting of the feedback information to the serving base station further comprising:

setting predetermined feedback information as a reference value; and transmitting an offset value representing a difference value between the reference value and other feedback information and the reference value to the serving base station.

6. A method of transmitting feedback information for collaborative multi input multi output (MIMO), the method comprising:

receiving a first feedback channel which is allocated by a serving base station for the collaborative MIMO;

receiving a second feedback channel which is allocated by a collaborative base station for the collaborative MIMO;

transmitting, to the serving base station and the collaborative base station, a collaborative MIMO indicator including information representing when the collaborative MIMO is started;

receiving data from the serving base station and the collaborative base station which perform the collaborative MIMO after the collaborative MIMO has been started;

setting predetermined feedback information as a reference value;

transmitting feedback information regarding to the serving base station via the first feedback channel, wherein the feedback information comprises an offset value representing a difference between the reference value and other feedback information and the reference value; and transmitting feedback information regarding to the collaborative base station via the second feedback channel, wherein the feedback information includes a channel state indicator, a precoding matrix indicator, and a channel quality indicator; and the feedback information further includes at least one of a user identifier, a base station identifier, a cell identifier and a collaborative MIMO indicator.

7. The method according to claim 6, further comprising:
acquiring the feedback information of each of the serving base station and the collaborative base station.

8. The method according to claim 6, wherein, as the feedback channel, a common channel is allocated to the serving base station and the collaborative base station with respect to at least one of a time, a space, and a frequency.

9. The method according to claim 8, wherein the feedback information is identified using code sets or hopping patterns which differ according to the base station and the collaborative base station on the common channel.

10. The method according to claim 6, wherein, as the feedback channel, different channels are allocated to the serving base station and the collaborative base station with respect to at least one of a time, a space and a frequency.

11. The method according to claim 6, wherein the feedback information further includes at least one of a signal power indicator and an interference state indicator.

12. A method of receiving feedback information for collaborative multi input multi output (MIMO), the method comprising:

allocating a feedback channel to a mobile station for the collaborative MIMO;

receiving information representing the start of the collaborative MIMO from the mobile station;

sending the information to a collaborative base station via a backbone network;

supporting the collaborative MIMO to the mobile station with the collaborative base station after the collaborative MIMO has been started;

receiving feedback information regarding to the base station and the collaborative base station from the mobile station via the feedback channel; and transmitting the feedback information to the collaborative base station via the backbone network.

* * * * *